G. H. DUNLOP.
LINING FOR TUNNELS AND FOR SHAFTS.
APPLICATION FILED JUNE 29, 1914.

1,125,013.

Patented Jan. 12, 1915.
2 SHEETS—SHEET 1.

G. H. DUNLOP.
LINING FOR TUNNELS AND FOR SHAFTS.
APPLICATION FILED JUNE 29, 1914.

1,125,013.

Patented Jan. 12, 1915.

2 SHEETS—SHEET 2.

UNITED STATES PATENT OFFICE.

GEORGE HENRY DUNLOP, OF BRISBANE, QUEENSLAND, AUSTRALIA.

LINING FOR TUNNELS AND FOR SHAFTS.

1,125,013.  Specification of Letters Patent.  Patented Jan. 12, 1915.

Application filed June 29, 1914. Serial No. 848,029.

*To all whom it may concern:*

Be it known that I, GEORGE HENRY DUNLOP, a subject of the King of Great Britain, residing at Commercial Travellers' Club, Elizabeth street, Brisbane, in the State of Queensland and Commonwealth of Australia, have invented a new and useful Improvement in Linings for Tunnels and for Shafts, of which the following is a specification.

This invention relates to linings employed to sustain the ground, in tunnels and in shafts, and more particularly in shield-driven tunnels, preparatory to the completion of the work with final lining of masonry or the like; though of course it may constitute the sole lining used where such masonry or the like is not desired.

Hereinafter the invention will be described as applied to a shield-driven tunnel of circular form.

The lining is composed of sections which will be called segments, which may be either molded or built up, a suitable number of which in place will form a ring constituting the completed lining for a short length of tunnel, together with connecting ribs which form rings between and in conjunction with the segmental rings, the whole being fitted with suitable flanges, cover plates, and joints, secured together with bolts or spikes, and provided with means for waterproofing the complete work when required; all of which are shown in the accompanying drawings in which:—

Figure 1:
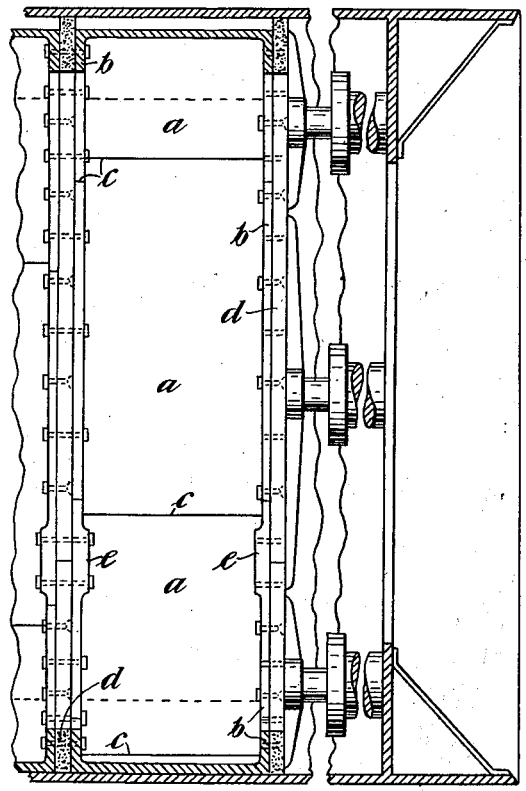
Figure 2:
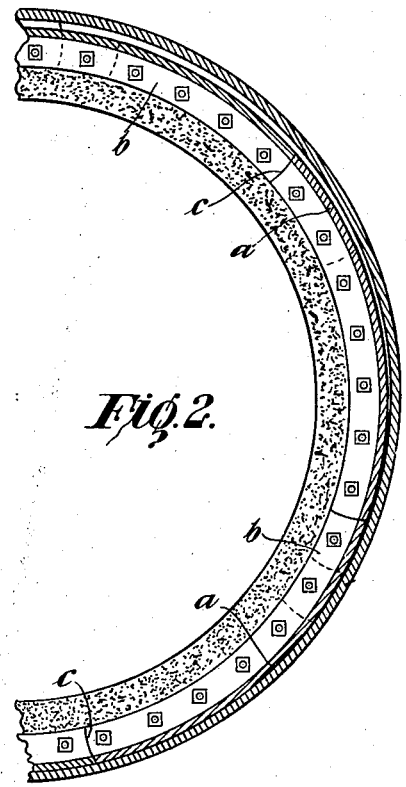
Figure 3:
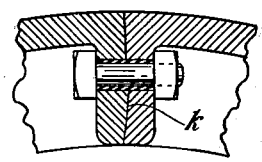
Figure 5:
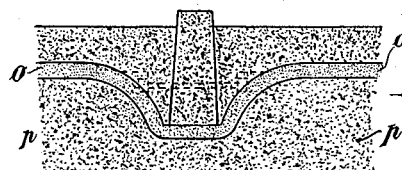
Figure 4:
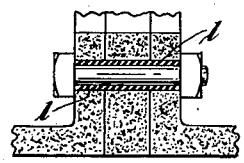
Figure 6:
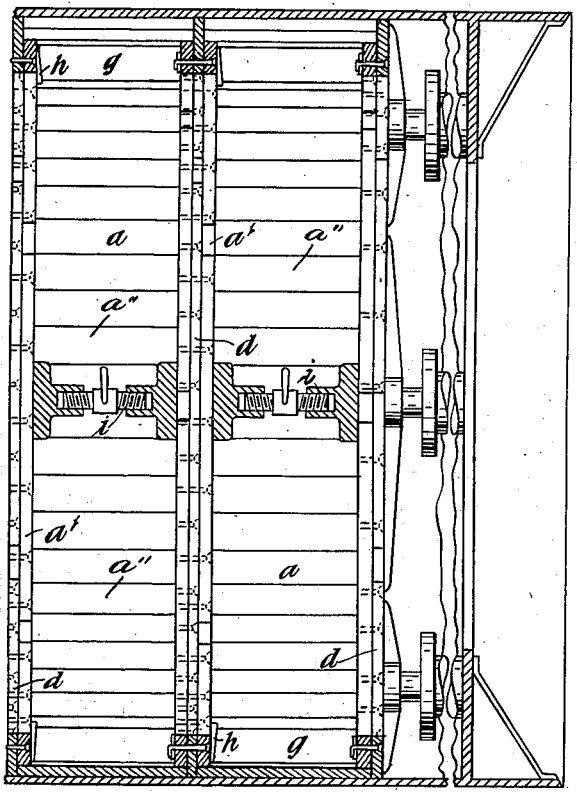
Figure 8:
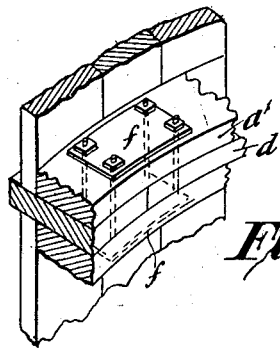
Figure 9:
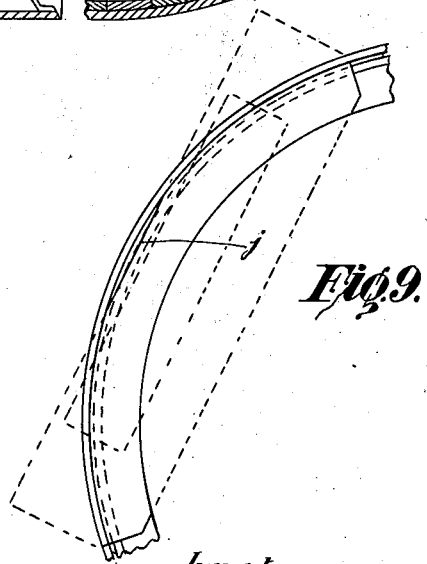
Figure 10:
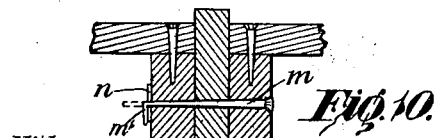

Figure 1 is a part longitudinal sectional elevation of a tunnel lining with molded segments and in which the shield is shown in outline. Fig. 2 is a part end elevation of Fig. 1 showing about one half of the circle, and also showing concrete placed within the molded lining. Figs. 3 and 4 show details of joints. Fig. 5 shows part of the lining completed with the waterproofing construction. Fig. 6 shows a part longitudinal sectional elevation and Fig. 7 a part end elevation similar respectively to Figs. 1 and 2 but with built-up wooden segments. Figs. 8, 9 and 10 show details of the construction in Figs. 6 and 7.

In Figs. 1 and 2 *a a* are segments having circumferential flanges *b b*, six segments forming the ring in the drawing, abutting upon each other at longitudinal joints *c c*, and having between the adjacent circumferential flanges of the two rings shown in Fig. 1, connecting ribs *d d*, three in number in the drawing, the flanges of the segmental rings and the connecting ribs being secured together with bolts as shown, the three-ply forming what I call a rib-ring. The connecting ribs are shown projecting outwardly beyond the segments. The flanges of the segments opposite the joints of the connecting ribs as at *e e*, are shown thicker in order to compensate thereat, and maintain the efficiency of the rib-ring against cross breaking strain due to unequal loading.

Figure 7:
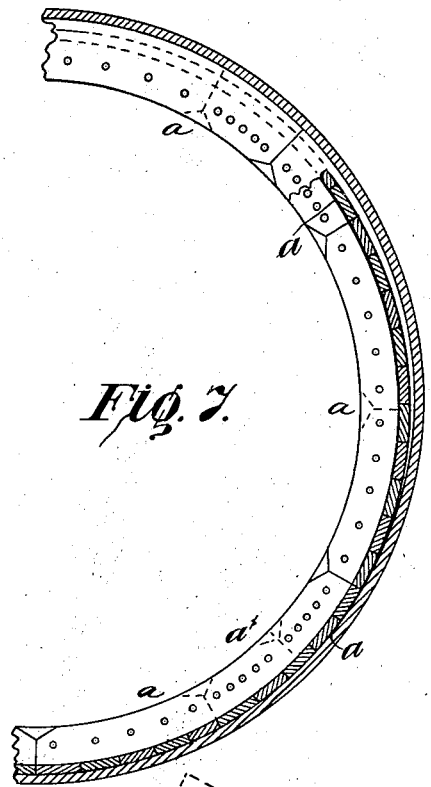

In Figs. 6 and 7 the segments *a a* are formed of wood each of two flanges or rib pieces as *a' a'* having nailed on to them logging or boarding as *a" a"* covering the outer curve thereof, and six of these built-up segments form the ring as illustrated, and having as before connecting ribs *d d*, four in number in this case, the three adjacent rib or flange pieces being secured together by spikes. In Fig. 8 opposite the joints of the connecting ribs *d d*, outside of the flanges of the segments, are shown metal cover plates *f f*, for the same purpose as the thicker flanges of the molded segments already described.

In Fig. 6 struts are shown which assist in bearing and distributing the pressure of the rams used for forcing the shield forward. These may be such as pieces of timber as *g g* fitted with wedges as *h h* at the ends, or suitable screw jacks as *i*. The molded segments may be similarly equipped if necessary. It is desirable to leave few longitudinal joints in each ring of lining. It is usually necessary however to have a considerable number of segments in the ring, so that each piece may be of convenient size, but as the connecting ribs can be handled more easily the number in the ring can be reduced possibly to two, though usually it would be convenient to have at least three in each ring; and with connecting ribs of wood a still greater number may probably be required, otherwise the timber would be cut across the grain too much near the ends of each piece unless the timber were bent to the curved shape. Metal connecting ribs may be formed into a one piece ring in place, as by electrically welding wrought iron ribs in place. In tunnel linings for use with shields, it is customary to have the outer diameter of the linings smaller than the inner diameter of the shield, for one reason in order that the shield may be moved more freely especially when its direction of progress is being changed. In order to prevent this, the ring of connecting ribs may be made equal to the inner diameter of the shield, while still leaving the shield as free from contact all around the lining as before except at the contact with the connecting ribs (which are narrow as compared with the segments of a ring), as soon as the tail end of it has passed the second last connecting ring in place, that is during the greater part of the length which the shield is moved forward for each ring. If necessary the outside of the connecting ribs may be rounded for further convenience in this respect.

In Figs. 1, 2, 6 and 7 the shield and the tunnel lining are shown as they usually are, circular in cross section, the inside diameter of the shield being slightly greater than the outside diameter of the lining, and with the lining built resting on the shield at the bottom, and with a space between at the top equal to the difference of the diameters. The connecting ribs $d\ d$ extend from the inside of the flanges of the segments out to contact or close fitting with the inside of the shield all around, owing to their being constructed wider at the top than at the bottom. This gives greater strength to the rib-ring especially against bending strain, the close fitting will prevent the passage of fine material into the tunnel between the shield and the lining, and will also serve in the same way to retain grout when forced outside of the lining to fill void spaces without the usual contrivances required for this purpose. The connecting ribs act as cover plates at the joints of the segments, so as to increase the efficiency of the rib-ring against bending, and being few in number it becomes quite practicable to provide extra strength in the flanges or ribs at each side of the joints of the connecting ribs by increased thickness or by cover plates as already described. There being fewer connecting ribs than segments in the rings admits of the joints of these ribs being located more suitably relative to the segmental joints, that is, they may be placed at those parts of the ring where the least tendency to cross bending is expected. When there are three connecting ribs in the ring, they may not be all of equal length. One may be short, acting as a closing piece, and in this case the coöperating cover plates, or thicken flanges, may extend over the joints at both ends of such short connecting rib. With wooden connecting ribs, if it is not otherwise necessary that they should extend out to the shield all around, the pieces may be cut from narrower planks, especially the top one, as shown at $j$ in Fig. 9 where the size of plank is shown by dotted lines, and the size of rib by full lines, the rib being deeper where it extends out to the shield near the ends and where also the timber is weaker against cross breaking strain being cut partly across the grain. It will be noted also that the rib piece of each wooden segment is not of as full radial depth at the ends as elsewhere. This small piece is liable to be split off and therefore an appreciable saving of timber may be effected by using a narrower plank without any appreciable loss of strength.

Hitherto the smaller circular lining has been built within the larger circular shield without any convenient means for guiding the form of the lining, and usually the lower part—about one half—of the lining has been built upon the inside of the shield, and the upper remaining part has been built to close at the top. Thus an initial distortion is given to the lining designed to be circular. With connecting ribs and segments in combination according to this invention, the connecting ribs being cut on the outside to conform, throughout the circle, or at least for a sufficient part of it, and on the inside to conform similarly with the inside of the flanges or ribs of the segments, the lining may be erected easily and true to form, the shield being used as a form for adjusting the connecting ribs, and then these as guides for adjusting the segments. After the shield has been moved forward the requisite distance, a ring of segments and a ring of connecting ribs following are placed in position within the rear end of the shield as shown in Figs. 1 and 6, the segments are connected to the rings of segments and connecting ribs last placed, the three ply rib-ring being finally secured together, and at the leading or shield-ward end the ring of segmental flanges or ribs and the connecting ribs are secured together sufficiently so that this two-ply rib-ring may retain its form against such forces as may be applied, including the pressure of the rams when moving the shield forward again.

The connecting ribs may project beyond the segments all around the lining, though it will usually be unnecessary that they should do so at the bottom.

It has been the practice with molded linings such as cast iron, to have longitudinal flanges as well as and similar to the circumferential flanges shown herein, each segment being in fact a hollow voussoir (see Fig. 3); all contiguous flanges being bolted together so as to render the ring capable of bearing unequal loading around the ring. These longitudinal flanges may be employed with this invention if desired though it is expected that with the greater stiffness against bending and the more perfect erection to true form, attainable with the use of the connecting ribs, that the longitudinal flanges may not be needed especially when the segments are molded of more bulky material than cast iron, as for example of concrete or reinforced concrete.

The longitudinal joints between the segments or ribs in tunnel linings are usually radial, except for keying pieces to close the ring, and as far as I know have always been made straight. With the present linings the longitudinal joints, especially with cast or molded parts, may be curved, as at $k$ in Fig. 3, so that the parts may accommodate themselves to slight deflections of the rings; and such curve may be a circular arc having a radius equal to the chord length of the part of the ring forced by the piece to have the concave curved joint. Other forms of curve may be chosen however. The abutting lagging of wooden segments need not be curved because the swelling of the timber when placed in the ground will accommodate any slight irregularities of fitting. The abutting ends of wooden ribs are not shown curved in the drawing because it is not considered that this will be necessary with wooden ribs properly fitted and secured together as shown and described; but of course they may be curved.

Molded linings may be secured together by bolts passing through holes sufficiently larger than the bolts to permit easy erection, and of subsequent packing as at $l\ l$, in Fig. 4, of the surplus space, before the nut is screwed on. Metallic packings, as lead, may be used with metallic linings as cast iron; and cement mortar may be used with concrete linings. Rivets of course would be preferable in any case where they could be used.

When the ribs of linings are formed wholly or mainly of wood, in two or more layers in the rib-ring, then as shown in Fig. 10, spikes or nails $m$ such as Ewbank's may be used for securing the layers together and of a length suitably greater than the combined thickness of the rib, layers through which they are driven, so that the ends may be turned over and clenched as at $m^1$. In this way the rib pieces are held more securely together, and so that as the timber absorbs moisture when in place in the ground, the swelling of the timber, so connected, forces the rib pieces together, thereby making the construction closer and tighter, the nails or spikes $m$ holding the pieces more firmly by being clenched as at $m^1$ than they would otherwise do, and thus having an additional value in such walls or linings. Furthermore washers $n$ may be used under the head and the point of the nail $m$ or may be under the point only, and the point may be clenched or riveted over the washer $n$ so as to give a better bearing on the timber. In this way also cover plates of wood or metal over joints may be tightly and effectively held on to the ribs when desired.

In Fig. 5 there is shown in part a construction having the molded segments and connecting ribs of concrete within which there is applied a layer of cement mortar, as $o, o$, applied to the inner surface of the segments and connecting ribs, and thoroughly compressed to make it compact and waterproof, and within this waterproof layer there is built further concrete lining as $p\ p$, of sufficient strength to sustain the waterproofing layer against the outside water pressure. The water, if necessary, may be excluded by compressed air during construction.

In Fig. 5 the segmental lining is shown adapted to transmit loading by acting as an arch abutting on the connecting rib and at the same time being rounded inside conveniently for receiving the waterproofing coating. The connecting ribs may then be made specially strong so as to bear much of the loading primarily coming upon the segments and thence transmitted to the ribs. Any suitable jointing material may be used, such as cement mortar, tarred felt, bitumen, or the like; but no jointing material is necessary with wooden linings. The last segment in each ring may be erected in each ring, using parallel joints as is usual in tunnel linings, but with all radial joints and without longitudinal flanges, and with the shield a little larger than the lining, the last piece may be placed by the following procedure: Approximately place all segments except the last, pushing them all out against the shield so as to leave the space for placing the last one as large as possible. Raise the last segment required to complete the ring drawn forward shield-ward slightly more than the thickness of the circumferential flange or rib—that is until this rib is occupying approximately the position afterward to be filled by the connecting rib— place one end of said last segment against the segment against which it is to abut on completion, then swing the other end of the said last segment up, push it back, and adjust the whole finally. The connecting ribs will not present difficulty with all radial joints since the rams on the shield can if necessary be adapted to give clearance for the last piece to be raised in advance of its final position and then pushed back.

While cast iron and reinforced concrete are probably the best materials for molded segments, and rolled steel and reinforced concrete for connecting ribs therewith respectively, and timber will be best for built-up segments and connecting ribs therewith, nevertheless, I do not confine my invention to those materials; nor to the particular forms or shapes shown in the drawings.

The lining according to this invention is applicable with evident modifications, in tunnels where the shield is not used where the ground is sufficiently firm to stand unsupported for the length and for the time necessary for inserting a ring of the segmental lining and of connecting ribs, or if the ground is wholly or partially supported by compressed air, or by temporary timbering or the like. And the lining may be applied in shaft sinking in a similar manner to that described for tunneling, with or without a shield or "box" in advance.

What I claim as my invention, and desire to secure by Letters Patent is:—

1. Linings for tunnels constructed of segments forming rings built within the shield and eccentric to it together with rings of connecting ribs concentric with the segmental rings on the inside and on the outside concentric with the inside of the shield.

2. Linings for tunnels comprising segmental rings having ribs or flanges combined with connecting ribs which lie between the ribs or flanges of the segmental rings and fit neatly and concentric in part within the shield while the segmental linings are of a lesser diameter than and lie eccentric within the shield.

In testimony whereof I have signed by name to this specification in the presence of two subscribing witnesses.

GEORGE HENRY DUNLOP.

Witnesses:
 PERCY NEWELL,
 H. R. HILL.